US012779495B2

(12) United States Patent
De

(10) Patent No.: US 12,779,495 B2
(45) Date of Patent: Nov. 3, 2026

(54) DIELECTRIC FILM-FORMING COMPOSITION

(71) Applicant: Fujifilm Electronic Materials U.S.A., Inc., N. Kingstown, RI (US)

(72) Inventor: Binod B. De, Attleboro, MA (US)

(73) Assignee: Fujifilm Electronic Materials U.S.A., Inc., North Kingstown, RI (US)

( * ) Notice: Subject to any disclaimer, the term of this patent is extended or adjusted under 35 U.S.C. 154(b) by 0 days.

(21) Appl. No.: 18/809,561

(22) Filed: Aug. 20, 2024

(65) Prior Publication Data

US 2025/0065365 A1 Feb. 27, 2025

Related U.S. Application Data

(60) Provisional application No. 63/533,731, filed on Aug. 21, 2023.

(51) Int. Cl.
*B05D 3/02* (2006.01)
*B05D 5/12* (2006.01)

(52) U.S. Cl.
CPC ............ *B05D 3/0254* (2013.01); *B05D 5/12* (2013.01); *B05D 2320/00* (2013.01); *B05D 2505/50* (2013.01); *B05D 2601/22* (2013.01)

(58) Field of Classification Search
CPC .................... C08L 79/04–085; C08L 2205/02
See application file for complete search history.

(56) References Cited

U.S. PATENT DOCUMENTS

| | | | |
|---|---|---|---|
| 3,595,900 | A | 7/1971 | Basil et al. |
| 4,248,986 | A | 2/1981 | Lal et al. |
| 4,678,841 | A | 7/1987 | Yoshizawa et al. |
| 4,785,034 | A | 11/1988 | Gaku et al. |
| 4,894,414 | A | 1/1990 | Yang et al. |
| 5,883,221 | A | 3/1999 | Sezi et al. |
| 6,143,467 | A | 11/2000 | Hsu et al. |
| 6,353,999 | B1 | 3/2002 | Cheng |
| 6,511,789 | B2 | 1/2003 | Naiini et al. |
| 8,288,656 | B2 | 10/2012 | Lee et al. |
| 9,519,216 | B2 | 12/2016 | Naiini et al. |
| 10,036,952 | B2 | 7/2018 | Malik et al. |
| 10,563,014 | B2 | 2/2020 | Malik et al. |
| 2004/0229166 | A1 | 11/2004 | Rushkin et al. |
| 2006/0093824 | A1 | 5/2006 | Nozaki |
| 2015/0219990 | A1 | 8/2015 | Malik et al. |
| 2016/0313642 | A1 | 10/2016 | Malik et al. |
| 2019/0018321 | A1 | 1/2019 | Malik et al. |
| 2022/0127459 | A1 | 4/2022 | De et al. |

FOREIGN PATENT DOCUMENTS

| | | | |
|---|---|---|---|
| EP | 0063043 | A1 | 10/1982 |
| WO | WO 2016/172089 | A1 | 10/2016 |

OTHER PUBLICATIONS

Resham Thapa (Polyimides (PI) & Polybenzoxazoles (PBO): Advanced Dielectric Polymers for Wafer Bumping & Wafer Level Packaging, https://waferdies.com/polyimides-pi-and-polybenzoxazoles-pbo-advanced-dielectric-polymers-for-wafer-bumping-wafer-level-packaging/) (Year: 2020).*
International Search Report and Written Opinion in International Appln. No. PCT/US2024/043012, mailed on Oct. 29, 2024, 15 pages.
Plueddemann, "Silane Coupling Agent," 1982 Plenum Press, New York, 1991, 6 pages (abstract only).
International Preliminary Report on Patentability in International Appln. No. PCT/US2024/043012, mailed on Mar. 5, 2026, 7 pages.

* cited by examiner

*Primary Examiner* — Wenwen Cai
(74) *Attorney, Agent, or Firm* — Fish & Richardson P.C.

(57) ABSTRACT

This disclosure relates to a dielectric film-forming composition that includes (a) at least one resin selected from the group consisting of: i) a fully imidized polyimide polymer; ii) a polyamic acid ester; iii) a cyclized polydiene resin; and iv) a mixture of a cyclized polydiene resin and a cyanate ester compound; and (b) at least one additive selected from a group consisting of: i) a polybenzoxazole (PBO) precursor; ii) PBO particles; iii) a mixture of PBO and silica particles; and iv) a PBO resin containing at least two reactive functional groups.

17 Claims, No Drawings

DIELECTRIC FILM-FORMING COMPOSITION

CROSS-REFERENCE TO RELATED APPLICATIONS

The present application claims priority to U.S. Provisional Application Ser. No. 63/533,731, filed on Aug. 21, 2023, the contents of which are hereby incorporated by reference in their entirety.

BACKGROUND

A dielectric material having low dielectric constant (Dk) and low dielectric loss tangent (Df) can reduce the transmission loss for material used in high frequency bands. It is an objective of this disclosure to provide dielectric material compositions which are suitable to suppress the transmission loss of electrical signal in the next-generation high-frequency (10 GHz or greater) applications.

SUMMARY

In one aspect, this disclosure features a dielectric film-forming composition that includes (a) at least one resin selected from the group consisting of: i) a fully imidized polyimide polymer; ii) a polyamic acid ester; iii) a cyclized polydiene resin; and iv) a mixture of a cyclized polydiene resin and a cyanate ester compound; and (b) at least one additive selected from a group consisting of: i) a polybenzoxazole (PBO) precursor; ii) PBO particles; iii) a mixture of PBO and silica particles; and iv) a PBO resin containing at least two reactive functional groups.

In another aspect, this disclosure features a process for preparing a dielectric film, the process including a) coating the dielectric film-forming composition described herein on a substrate to form a film; and b) optionally baking the film at a temperature from about 50° C. to about 150° C. for about 20 seconds to about 240 seconds.

In another aspect, this disclosure features a process for preparing a dry film, the process including a) coating a carrier substrate with the dielectric film-forming composition described herein to form a coated composition; b) drying the coated composition to form a dielectric film; and c) optionally, applying a protective layer to the dielectric film.

In still another aspect, this disclosure features a dielectric film containing (a) at least one resin selected from the group consisting of: i) a fully imidized polyimide polymer; ii) a polyamic acid ester; iii) a cyclized polydiene resin; and iv) a mixture of a cyclized polydiene resin and a cyanate ester compound; and (b) at least one additive selected from a group consisting of: i) a polybenzoxazole (PBO) precursor; ii) PBO particles; iii) a mixture of PBO and silica particles; and iv) a PBO polymer containing at least two reactive functional groups.

DETAILED DESCRIPTION

In general, this disclosure relates to dielectric film-forming compositions, as well as related processes, dry films, and dielectric films. In some embodiments, the dielectric film-forming compositions described herein include (a) at least one resin and (b) at least one additive (e.g., a dielectric properties enhancing additive). In some embodiments, the dielectric film-forming compositions described herein can be photosensitive and/or heat-curable.

In some embodiments, the dielectric film-forming compositions described herein include at least one (e.g., two, three, or four) additive. In some embodiments, the additive is selected from a group consisting of: i) a polybenzoxazole (PBO) precursor; ii) PBO particles; iii) a mixture of PBO and silica particles; and iv) a PBO resin containing at least two reactive functional groups. Without wishing to be bound by theory, it is believed that including the additive in the dielectric film-forming compositions described herein can improve their electrical properties, such as lowering Df and/or Dk.

In some embodiments, the additive can include a curable PBO precursor (e.g., a photosensitive PBO precursor), such as a chemically amplified PBO precursor. The aqueous base solubility of the PBO precursor is reduced by protection of the aromatic hydroxyl group in the PBO precursor by attachment of acid labile groups. Restoration of the polymer alkali solubility is accomplished through the action of an acid produced by photolysis of a photoacid generator (PAG). The protecting groups can be any suitable acid labile group, such as acetals, ketals, carbonates, ethers, silyl ethers, moieties containing t-butyl esters, and mixtures thereof. Using this concept, a positive-working photosensitive resin composition comprising a PBO precursor bearing acid labile functional groups, a photoacid generator, and a solvent can be prepared. After photolithographic processing, the patterned layer can be converted to a heat resistant polybenzoxazole coating by application of additional heating.

In some embodiments, a PBO precursor described herein can include acid labile functional groups and can having the following Structure (1):

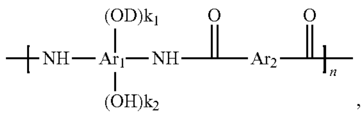

(I)

in which $k_1$ is an integer of 0, 1, or 2, $k_2$ is an integer of 0 or 1, and the sum of $k_1$ and $k_2$ is 0 or 2; $Ar_1$ is a tetravalent aromatic, aliphatic, or heterocyclic group, or a mixture of a tetravalent aromatic, aliphatic, or heterocyclic group and a divalent aromatic, aliphatic, or heterocyclic group, where the fraction of $Ar_1$ being a divalent group is 0-60 mole % and the sum of $Ar_1$ being a tetravalent group and a divalent group is 100 mole %; $Ar_2$ is a divalent aromatic, aliphatic, or heterocyclic group or siloxane group; D is a monovalent acid labile group and, in combination with the oxygen atom to which it is attached, is selected from the group consisting of acetals, ketals, carbonates, ethers, moieties containing t-butyl ester groups, and mixtures thereof; and n is an integer from 20 to 200.

In some embodiments, $Ar_1$ includes the following moieties:

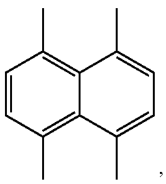
,
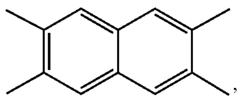
,

-continued

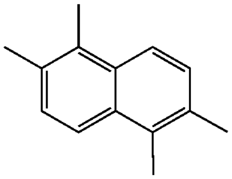

,

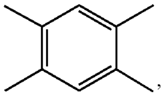

,

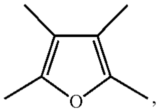

,

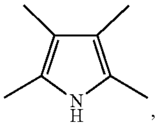

,

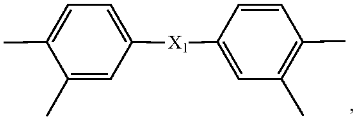

, and

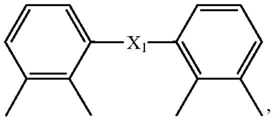

, in which $X_1$ is —O—, —S—, —$C(CF_3)_2$—, —$C(CH_3)_2$—, —$CH_2$—, —$SO_2$—, —NHCO—, —C(O)—, —C(O)—C(O)—, —C(O)O—, or —$(CH_2)_m$—$Si(Z)_2$—O—$Si(Z)_2$—$(CH_2)_m$—, Z is H or $C_1$-$C_6$ alkyl and m is an integer from 1 to 6.

In some embodiments, $Ar_2$ includes the following moieties:

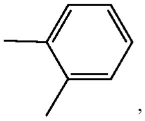

,

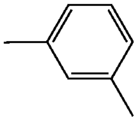

,

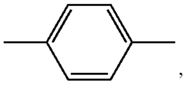

,

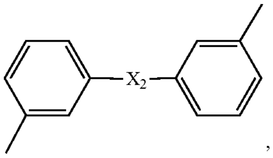

,

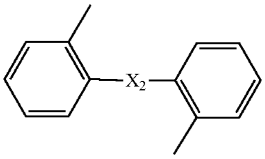

,

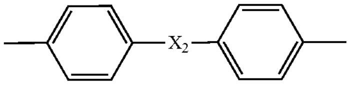

,

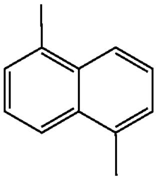

,

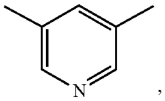

,

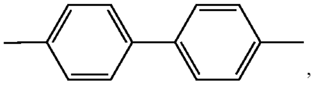

,

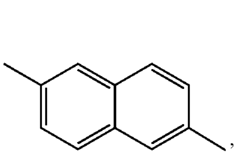

,

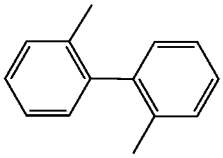

, and

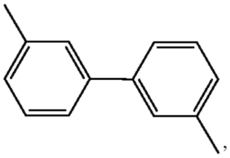

, in which $X_2$ is —C(O)—C(O)—, —C(O)O—, or —$(CH_2)_p$—$Si(Z)_2$—O—$Si(Z)_2$—$(CH_2)_p$—, Z is H or $C_1$-$C_6$ alkyl and p is an integer from 1 to 6. In some embodiments, the PBO precursor can contain one or more different $Ar_1$ and $Ar_2$ groups.

In some embodiments, D is any suitable monovalent acid labile group, such as acetals, ketals, carbonates, ethers, silyl ethers, moieties containing t-butyl esters, mixtures thereof, which includes but is not limited to moieties of the formula:

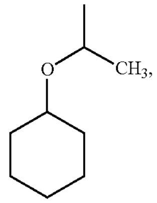

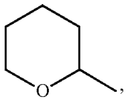

,

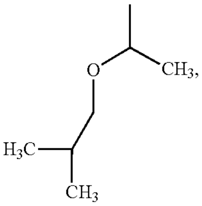

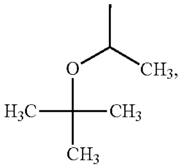

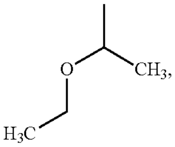

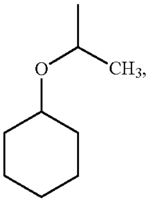

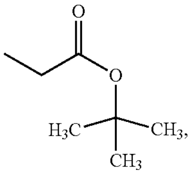

and

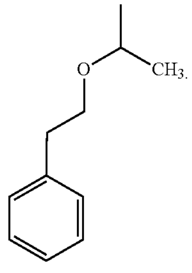

In embodiments when the dielectric film-forming compositions described herein include a protected PBO precursor bearing acid labile functional groups, the compositions can also include a photoacid generator and a solvent. Optionally, the compositions can contain a photosensitizer, an adhesion promoter, a leveling agent, or other additives. After exposure to light, the photogenerated acid catalyzes deblocking of the protected PBO precursor, and converts it to an aqueous base soluble PBO precursor as shown in Reaction (1):

Reaction (1)

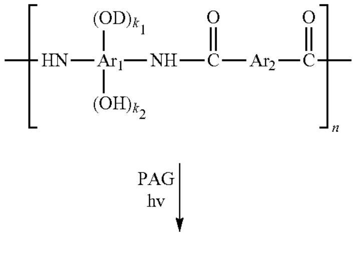

-continued

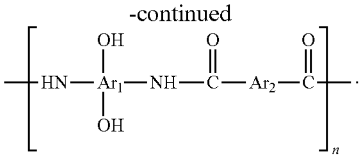

In general, any suitable photoacid generator compounds can be used remove acid labile functional groups. For example, suitable photoacid generator compounds include triazine compounds, sulfonates, disulfones, onium salts, and mixtures thereof. Examples of suitable onium salts include iodonium, sulfonium, phosphonium, diazonium, sulfoxonium, and mixtures thereof. In some embodiments, photoacid generators include those that can be used in g-line, i-line, 248 nm, and broadband lithography.

The PBO precursor bearing acid labile functional groups, shown in Formula (A) can be derived from the reaction of a PBO precursor with a vinyl ether having the formula $R^1$═CH—$OR^2$ in the presence of an acid catalyst, wherein $R^1$ is (a) a linear, branched or cyclic alkylene group preferably having 1 to 10 carbon atoms, (b) a linear, branched or cyclic haloalkylene group preferably having 1 to 10 carbon atoms, or (c) an aralkylene group. $R^2$ is a linear, branched, cyclic alkyl, aralkyl, or linear or branched alkyl group bearing cycloalkyl, substituted cycloalkyl, aryl, and substituted aryl groups, preferably having 1 to 10 carbon atoms. Another suitable method of preparing the PBO precursor bearing acid labile functional groups is from the reaction of the PBO precursor with a di-t-butyl dicarbonate in the presence of a base. The PBO precursor bearing acid labile functional groups can also be synthesized by reacting the PBO precursor, an alcohol, and a t-butyl vinyl ether in the presence of an acid.

In some embodiments, the PBO precursor described herein may not include an acid labile functional group and can have Structure (II) shown below (II)

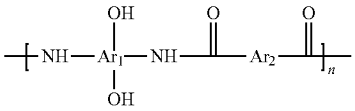

, in which $Ar_1$ is a tetravalent aromatic, aliphatic, or heterocyclic group, or a mixture of a tetravalent aromatic, aliphatic, or heterocyclic group and a divalent aromatic, aliphatic, or heterocyclic group, where the fraction of $Ar_1$ being a divalent group is 0-60 mole % and the sum of $Ar_1$ being a tetravalent group and a divalent group is 100 mole %; $Ar^2$ is a divalent aromatic group, aliphatic group, heterocyclic group, siloxane group, or mixtures thereof; and n is an integer from 20 to 200. In such embodiments, the PBO precursor can be a non-photosensitive PBO precursor.

An acetal protected PBO precursor can be prepared by an acid catalyzed addition reaction of vinyl ethers and PBO precursors. Any suitable acid catalyst can be used for the reaction. Examples of suitable acid catalysts include hydrochloric acid, p-toluene sulfonic acid, and pyridium-p-toluene sulfonate. The acid catalyst can be added in amounts ranging from about 0.001% by weight to about 3.0% by weight. Several vinyl ethers with a range of activation energies toward acid induced deprotection can be used in this reaction. In some embodiments, protected PBO precursors can be prepared using a process that includes the acid catalyzed reaction of a PBO precursor, t-butyl vinyl ether, and an alkyl-, alkylene-, cycloalkyl-, or arylalkyl-alcohol.

A typical synthetic reaction mechanism for production of an acetal protected PBO precursor is shown in reaction (2):

Reaction (2)

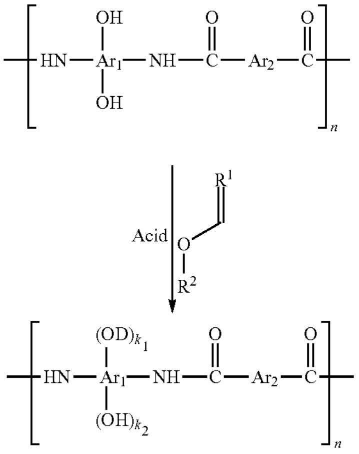

in which $k_1$, $k_2$, n, $R^1$ and $R^2$ are defined as before, and D is defined as before but excludes the t-butoxycarbonyl group, ethers, silyl ether, and carbonates. In some embodiments, $R^2$ can be t-butyl, isobutyl, ethyl, cyclohexyl, ethyl cyclohexyl, or phenethyl.

In some embodiments, the PBO precursor can be prepared by reacting one or more aromatic diamino dihydroxy compounds, optionally one or more aromatic or aliphatic diamines, and one or more aromatic or aliphatic acids or acid halides. For example, the diamine dihydroxy compounds can be those that form the moiety

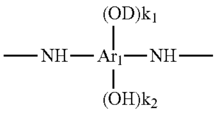

in Structure (I) described herein or the moiety

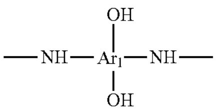

in Structure (II) described herein. Examples of suitable acids or acid halides include aromatic or aliphatic dicarboxylic acids and dicarboxylic acid chlorides. For example, the acids or acid halides can be those that form the moiety

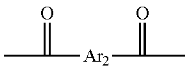

in Structures (1) or (II) described herein. The synthesized PBO precursor can be a homopolymer or a copolymer.

Other examples of PBO precursors, PBO polymers, and reagents for forming PBO precursors and PBO polymers are described in described in, e.g., U.S. Pat. Nos. 6,143,467 and 5,883,221; the contents of which are hereby incorporated by reference.

In some embodiments, PBO polymers can be produced by chemical or thermal cyclization of PBO precursors (e.g., polyhydroxy amides (PHAs)), which can be prepared from diamines (e.g., aromatic diamines) and diacyl chlorides or diacids (e.g., aromatic, aliphatic or a mixture of aromatic and aliphatic diacyl chlorides or diacids) in a variety of organic solvents. PBO polymers, PBO particles, and PBO polymers containing at least two reactive functional group (e.g., having a low molecular weight) can be produced following reaction (3) shown below, where $R^1$ is an aromatic group, an aliphatic group, or a mixture thereof; Y is a OH group or halogen atom; X is a divalent group or a single bond; $R^2$ is a hydrogen or an alkyl group (e.g., a $C_1$-$C_6$ alkyl group).

As shown in reaction (3) above, in some embodiments, the PBO precursor described herein can react with an end-capping compound (e.g., a compound containing a carbon-carbon double or triple bond) to form a PBO polymer containing at least two reactive functional groups. Examples of such end-capping compounds include (alkyl) acrylate compounds.

In some embodiments, the additive can be in an amount of at least about 5 wt % (e.g., at least about 10 wt %, at least about 15 wt %, at least about 20 wt %, at least about 25 wt %, at least about 30 wt %, at least about 35 wt %, or at least about 40 wt %) to at most about 50 wt % (e.g., at most about 45 wt %, at most about 40 wt %, at most about 35 wt %, at most about 30 wt %, at most about 25 wt %, at most about 20 wt %, at most about 15 wt %, or at most about 10 wt %) of a dielectric film-forming composition described herein.

Reaction (3)

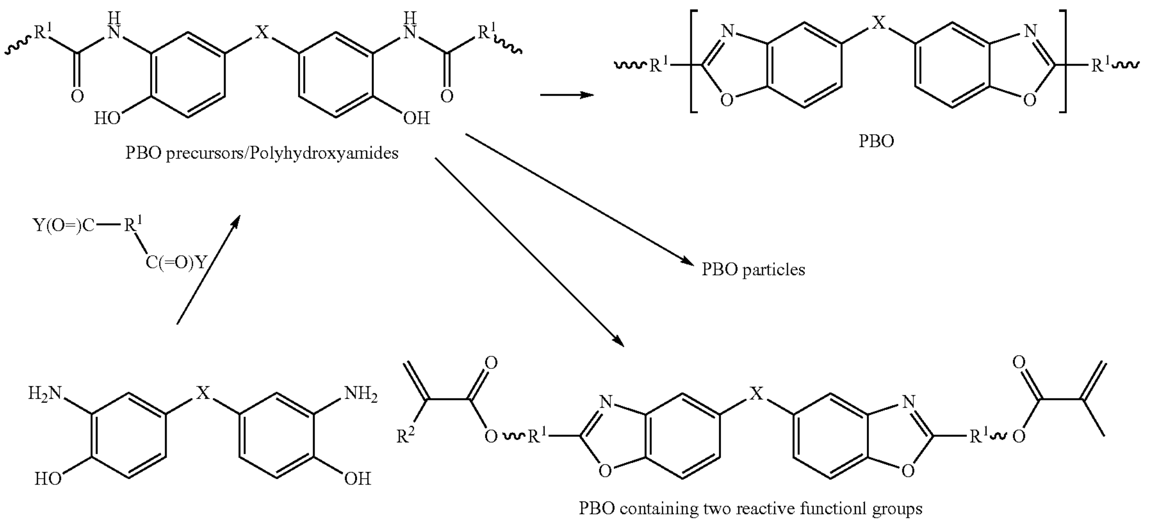

A single or mixture of diamine diphenol can be used in the above reaction to form the PBO precursors or PBO polymers described herein.

As shown in reaction (3) above, in some embodiments, the PBO precursor described herein can be cured to form oxazole rings, thereby forming PBO polymers. Curing can be performed by baking a PBO precursor at a suitable temperature (e.g., from about 150° C. to about 450° C.) to convert the PBO precursor to a PBO.

As shown in reaction (3) above, in some embodiments, the PBO precursor described herein can form PBO particles when cured at a relatively high temperature. For example, the PBO precursor can be prepared in the form of particles and then cured at a relatively high temperature to form PBO particles. In some embodiments, the PBO particles thus formed do not include particles made from other materials and include a PBO polymer only.

In some embodiments, the PBO precursor described herein can be coated onto inorganic particles (e.g., silica particles). The coated particles can then be cured to form PBO coated particles. In some embodiments, the PBO precursor described herein can be mixed with inorganic particles (e.g., silica particles). The mixture can then be cured to form a mixture of PBO particles and silica particles.

In some embodiments, the dielectric film-forming compositions described herein include at least one (e.g., two, three, or four) resin in addition to the additive described above. In some embodiments, the resin can be selected from the group consisting of: i) a fully imidized polyimide polymer; ii) a polyamic acid ester; iii) a cyclized polydiene resin; and iv) a mixture of a cyclized polydiene resin and a cyanate ester compound. In some embodiments, the dielectric film-forming compositions described herein can include any combination of polymers i)-iv). As used herein, the term "fully imidized" means the polyimide polymers of this disclosure are at least about 90% (e.g., at least about 95%, at least about 98%, at least about 99%, or about 100%) imidized. Imidization to form a polyimide can be confirmed by observation of characteristic absorptions in the infrared spectrum from 1770 and 1700 cm-1 attributable to the imide ring structure.

In some embodiments, the at least one fully imidized polyimide described herein is prepared by reaction of at least one diamine as a monomer with at least one dianhydride (e.g., at least one tetracarboxylic acid dianhydride) as another monomer. Examples of diamines include, but are not limited to, p-phenylenediamine, m-phenylenediamine, o-phenylenediamine, 3-methyl-1,2-benzene-diamine, 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,2-diaminocyclohexane, 1,4-diaminocyclohexane, 1,3-cyclohexanebis(methylamine), 5-amino-1,3,3-trimethyl cyclohexanemethanamine, 2,5-diaminobenzotrifluoride, 3,5-diaminobenzotrifluoride, 1,3-diamino-2,4,5,6-tetrafluorobenzene, 4,4'-oxydianiline, 3,4'-oxydianiline, 3,3'-oxydianiline, 3,3'-diaminodiphenylsulfone, 4,4'-diaminodiphenylsulfones, 4,4'-isopropylidenedianiline, 4,4'-diaminodiphenylmethane, 2,2-bis(4-aminophenyl)propane, 4,4' diaminodiphenyl propane, 4,4'-diaminodiphenyl sulfide, 4,4'-diaminodiphenylsulfone, 4-aminophenyl-3-aminobenzoate, 2,2'-dimethyl-4,4'-diaminobiphenyl, 3,3'-dimethyl-4,4'-diaminobiphenyl, 2,2'-bis(trifluoromethyl) benzidine, 3,3'-bis(trifluoromethyl) benzidine, 2,2-bis[4-(4-aminophenoxy phenyl)]hexafluoropropane, 2,2-bis(3-amino-4-methylphenyl)-hexafluoropropane, 2,2-bis(3-aminophenyl)-1,1,1,3,3,3-hexafluoropropane, 1,3-bis-(4-aminophenoxy) benzene, 1,3-bis-(3-aminophenoxy)benzene, 1,4-bis-(4-aminophenoxy)benzene, 1,4-bis-(3-aminophenoxy) benzene, 1-(4-aminophenoxy)-3-(3-aminophenoxy) benzene, 2,2'-bis-(4-phenoxyaniline)isopropylidene, bis(p-beta-amino-t-butylphenyl)ether, p-bis-2-(2-methyl-4-aminopentyl)benzene, p-bis(1,1-dimethyl-5-aminopentyl) benzene, 3,3'-dimethyl-4,4'-diaminobiphenyl, 4,4'-diaminobenzophenone, 3'-dichlorobenzidine, 2,2-bis [4-(4-aminophenoxy)phenyl]propane, 4,4'-[1,3-phenylenebis(1-Methyl-ethylidene)]bisaniline, 4,4'-[1,4-phenylenebis(1-methyl-ethylidene)]bisaniline, 2,2-bis [4-(4-aminophenoxy) phenyl]sulfone, 2,2-bis [4-(3-aminophenoxy) benzene], 1,4-bis(4-aminophenoxy) benzene, 1,3-bis(4-aminophenoxy) benzene, (1,3'-bis(3-aminophenoxy) benzene, and 9H-fluorene-2,6-diamine.

In some embodiments, the at least one diamine includes a compound selected from the group consisting of a diamine of Structure (IIIa) and a diamine of Structure (IIIb):

(IIIa)

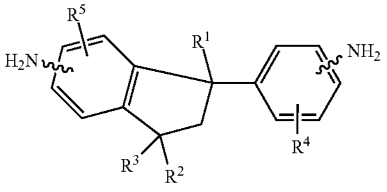

and (IIIb)

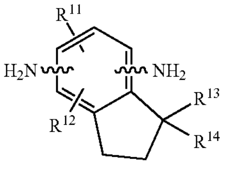

in which each of $R^1$, $R^2$, $R^3$, $R^4$, $R^5$, $R^{11}$, $R^{12}$, $R^{13}$, and $R^{14}$, independently, is H, a substituted or unsubstituted $C_1$-$C_6$ linear or branched alkyl group, or $C_5$-$C_7$ cycloalkyl group.

Examples of the substituted or unsubstituted $C_1$-$C_6$ linear or branched alkyl groups in $R^1$, $R^2$, $R^3$, $R^4$, $R^5$, $R^{11}$, $R^{12}$, $R^{13}$, and $R^{14}$ include, but are not limited to, methyl, ethyl, propyl, isopropyl, butyl, isobutyl, t-butyl, amyl, hexyl, and 2-methylhexyl. Examples of the $C_5$-$C_7$ cycloalkyl group in $R^1$, $R^2$, $R^3$, $R^4$, $R^5$, $R^{11}$, $R^{12}$, $R^{13}$, and $R^{14}$ include, but are not limited to, cyclopentyl, cyclohexyl, and cycloheptyl.

Examples of diamines of Structure (IIIa) or (IIIb) include, but are not limited to, 1-(4-aminophenyl)-1,3,3-trimethylindan-5-amine (alternative names including 4,4'-[1,4-phenylene-bis(1-methylethylidene)]bisaniline, 1-(4-aminophenyl)-1,3,3-trimethyl-2H-inden-5-amine, 1-(4-aminophenyl)-1,3,3-trimethyl-indan-5-amine, [1-(4-aminophenyl)-1,3,3-trimethyl-indan-5-yl]amine, and 1-(4-aminophenyl)-2,3-dihydro-1,3,3-trimethyl-1H-inden-5-amine), 5-amino-6-methyl-1-(3'-amino-4'-methylphenyl)-1,3,3-trimethylindan, 4-amino-6-methyl-1-(3'-amino-4'-methylphenyl)-1,3,3-trimethylindan, 5,7-diamino-1,1-dimethylindan, 4,7-diamino-1,1-dimethylindan, 5,7-diamino-1,1,4-trimethylindan, 5,7-diamino-1,1,6-trimethylindan, and 5,7-diamino-1,1-dimethyl-4-ethylindan.

In some embodiments, the at least one diamine includes (a) a compound selected from the group consisting of a diamine of Structure (IIIa) and a diamine of Structure (IIIb), and (b) at least one diamine of Structure (IV), (IV)

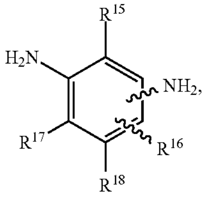

in which each of $R^{15}$, $R^{16}$, $R^{17}$ and $R^{18}$, independently, can be H, a substituted or unsubstituted $C_1$-$C_6$ linear or branched alkyl group, or $C_5$-$C_7$ cycloalkyl group, provided that at least two of $R^{15}$, $R^{16}$, $R^{17}$ and $R^{18}$ are not hydrogen.

Examples of the substituted or unsubstituted $C_1$-$C_6$ linear or branched alkyl groups in $R^{15}$, $R^{16}$, $R^{17}$ and $R^{18}$ include, but are not limited to, methyl, ethyl, propyl, isopropyl, butyl, isobutyl, t-butyl, amyl, hexyl, and 2-methylhexyl. Examples of the $C_5$-$C_7$ cycloalkyl group in $R^{15}$, $R^{16}$, $R^{17}$ and $R^{18}$ include, but are not limited to, cyclopentyl, cyclohexyl, and cycloheptyl.

Examples of diamines of Structure (IV) include, but are not limited to, 2,3,5,6-tetramethylphenylenediamine, 2,4-diamino-1,3,5-trimethylbenzene, 2,4-diamino-1,3,5-triethylbenzene, 2,4-diamino-3,5-dimethyl-1-ethylbenzene, 2,4-diamino-1,5-dimethyl-3-ethylbenzene, 2,4-diamino-1,3,5-triisopropylbenzene, 2,3,5,6-tetraisopropylphenylenediamine and 2,4-diamino-1,3,5,6-tetramethylbenzene.

In some embodiments, the molar percentage of the diamines of Structures (IIIa) and (IIIb) in the total amount of diamines (e.g., diamines of Structures (IIIa), (IIIb), and (IV)) is at least about 10% (e.g., at least about 20%, at least about 25%, at least about 30%, at least about 35%, at least about 40%, at least about 45%, or at least about 50%) to at most about 90% (e.g., at most about 85%, at most about 80%, at most about 75%, at most about 70%, at most about 65%, or at most about 60%).

In some embodiments, the molar percentage of the diamines of Structure (IV) in the total amount of diamines (e.g., diamines of Structure (IIIa), (IIIb), and (IV)) is at least about 10% (e.g., at least about 20%, at least about 25%, at least about 30%, at least about 35%, at least about 40%, at least about 45%, or at least about 50%) to at most about 90% (e.g., at most about 85%, at most about 80%, at most about 75%, at most about 70%, at most about 65%, or at most about 60%).

In general, to form a polyimide polymer described herein, the diamines can be reacted with at least one dianhydride, such as at least one tetracarboxylic acid dianhydride.

Examples of the tetracarboxylic acid anhydrides include, but are not limited to, 1-(3',4'-dicarboxyphenyl)-1,3,3-trimethylindan-5,6-dicarboxylic acid dianhydride, 1-(3',4'-dicarboxyphenyl)-1,3,3-trimethylindan-6,7-dicarboxylic acid dianhydride, 1-(3',4'-dicarboxyphenyl)-3-methylindan-5,6-dicarboxylic acid dianhydride, 1-(3',4'-dicarboxyphenyl)-3-methylindan-6,7-dicarboxylic acid anhydride, pyromellitic dianhydride, benzene-1,2,3,4-tetracarboxylic dianhydride, 2,3,5,6-naphthalenetetracarboxylic acid dianhydride, 2,3,6,7-naphthalenetetracarboxylic acid dianhydride, 1,4,5,8-naphthalenetetracarboxylic acid dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-,8,9,10-tetracarboxylic dianhydride, 3,4,9,10-perylenetetracarboxylic acid dianhydride, pyrazine-2,3,5,6-tetracarboxylic dianhydride, thiophene-2,3,4,5-tetracarboxylic dianhydride, 2,3,5,6-pyridinetetracarboxylic acid dianhydride, butane-1,2,3,4-tetracarboxylic acid dianhydride, 1,2,3,4-cyclopentanetetracarboxylic acid dianhydride, cyclobutane-1,2,3,4-tetracarboxylic acid dianhydride, cyclopentane-1,2,3,4-tetracarboxylic acid dianhydride, cyclohexane-1,2,4,5-tetracarboxylic acid dianhydride, norbornane-2,3,5,6-tetracarboxylic acid dianhydride, bicyclo[2.2.2]oct-7-ene-3,4,8,9-tetracarboxylic acid dianhydride, tetracyclo[4.4.1.$0^{2,5}$.$0^{7,10}$]undecane-1,2,3,4-tetracarboxylic acid dianhydride, 3,3',4,4'-benzophenone tetracarboxylic dianhydride, 2,2',3,3'-benzophenone tetracarboxylic dianhydride, 2,3,3',4'-benzophenone tetracarboxylic dianhydride, 3,3',4,4'-diphenylsulfone tetracarboxylic dianhydride, 2,2',3,3'-diphenylsulfone tetracarboxylic dianhydride, 2,3,3',4'-diphenylsulfone tetracarboxylic dianhydride, 3,3',4,4'-diphenyl ether tetracarboxylic dianhydride, 2,2',3,3'-diphenyl ether tetracarboxylic dianhydride, 2,3,3',4'-diphenyl ether tetracarboxylic dianhydride, 2,2-[bis(3, 4-dicarboxyphenyl)]hexafluoropropane dianhydride, ethyleneglycol bis(anhydrotrimellitate), and 5-(2,5-dioxotetrahydro)-3-methyl-3-cyclohexene-1,2-dicarboxylic dianhydride.

Other fully imidized polyimide polymers are described in, e.g., WO 2016/172089, U.S. Pat. Nos. 10,036,952 and 10,563,014, and U.S. Application Publication No. 2015/0219990, the contents of which are incorporated herein by reference.

In some embodiments, the at least one polyamic acid ester described herein can be prepared by using the diamines and dianhydrides described herein as monomers using methods known in the art. In some embodiments, one or more diamines are combined with one or more tetracarboxylic acid dianhydrides in at least one (e.g., two, three, or more) polymerization solvent to form a polyamic acid (PAA) polymer. In some embodiments, the PAA polymer thus formed can be esterified to form a polyamic acid ester, which can remain soluble in the polymerization solvents. Examples of suitable polyamic acid esters and their compositions have been described in, e.g., U.S. Pat. Nos. 6,511,789 and 8,288,656, the contents of which are hereby incorporated by reference.

In some embodiments, the cyclized polydiene resin described herein (e.g., substituted or unsubstituted) can include homopolymers of conjugated dienes such as isoprene, butadiene, pentadiene, etc. In other embodiments, the cyclized polydiene resin include copolymers of such conjugated dienes with olefins (e.g., ethylene or propylene), styrene, or acrylates. Cyclization of polydiene occurs under influence of heat, light, ultraviolet or nuclear radiation or in the presence of cation-donor catalysts (e.g., mineral acids, organic acids, or Lewis's acids). For example, two neighboring polymer structural units can participate in a cis olefin catalyzed cyclization, which can create a monocyclic structure by eliminating one double bond. When cyclization continues, bi- or tri-cyclic structures can be created in later stages. Gradually, the unsaturation and elasticity of a polydiene is reduced as the result of successive cyclization of cis double bonds, and the toughness of the polydiene is increased. In some embodiments, the cyclization can be more efficient in polyisoprene than in polybutadiene. By controlling the temperature, catalyst concentration and/or reaction time, a cyclization degree of from about 50% to about 95% can be achieved. Examples of such cyclization process have been described in, e.g., U.S. Pat. Nos. 4,678,841 and 4,248,986, and European Patent No. 0063043, the contents of which are hereby incorporated by reference.

The cyclized polydiene resin can have any suitable weight average molecular weight (Mw) depending on the particular product application, solvent employed, and method of applying to the underlying substrate. For example, the cyclized polydiene resin can have a weight average molecular weight of at least about 5,000 Daltons (e.g., at least about 25,000 Daltons, at least about 50,000 Daltons, at least about 75,000 Dalton, at least about 100,000 Dalton, at least about 125,000 Daltons, or at least about 150,000 Daltons) and/or at most about 500,000 Daltons (e.g., at most about 400,000 Daltons, at most about 300,000 Daltons, or at most about 200,000 Daltons).

In some embodiments, the dielectric film-forming composition described herein can include a mixture of cyclized polydiene resins. The mixture can include:

a) at least one cyclized polydiene resin with a weight average molecular weight from about 5,000 Daltons to about 20,000 Daltons;
b) at least one cyclized polydiene resin with a weight average molecular weight of from about 25,000 Daltons to about 60,000 Daltons; and
c) at least one cyclized polydiene resin with a weight average molecular weight of from about 70,000 Daltons to about 200,000 Daltons.

Without wishing to be bound by theory, it is believed that a dielectric film-forming composition containing a mixture of cyclized polydiene resins having different molecular weights can result in a dielectric film having superior coating quality and film properties.

In some embodiments, the double bond content in an uncyclized polyisoprene is 14.7 mmols unsaturation per 1 gram of polyisoprene, i.e., the inverse of the molecular weight of an isoprene unit (i.e., 68 g/mol). In general, the double bond content in a cyclized polyisoprene decreases as the degree of cyclization increases. In some embodiments, the amount of double bond or unsaturation of a cyclized polydiene resin (e.g., in xylene) can range from at least about 1 mmol (e.g., at least about 2 mmols, at least about 3 mmols, at least about 4 mmols, or at least about 5 mmols) to at most about 12 mmols (e.g., at most about 11 mmols, at least about 10 mmols, at least about 9 mmols, or at least about 8 mmols) per 1 gram of polyisoprene after cyclization.

In general, an increase of bicyclic and tricyclic structures in a cyclized polydiene resin increases the glass transition temperature (Tg) of the polydiene resin. In some embodiments, the Tg of the cyclized polydiene resin disclosed herein can be at least about 0° C. (e.g., at least about 5° C., at least about 10° C., at least about 15° C., at least about 20° C., or at least about 25° C.) and/or at most about 100° C.

(e.g., at most about 90° C., at most about 80° C., at most about 70° C., at most about 60° C., or at most about 50° C.). In some embodiments, two or more cyclized polydiene resins having different properties (e.g., different unsaturation or Tg) can be used together in the dielectric film-forming composition described herein.

In some embodiments, the cyclized polydiene resin described herein can include one or more substituted or unsubstituted alkenyl group. As used herein, possible substituents on a substituted group (e.g., a substituted alkyl, alkenyl, alkylene, cycloalkyl, cycloalkylene, aryl, arylalkyl, or heteroaryl group) or a substituted compound include C1-C10 alkyl (e.g., methyl, ethyl, or propyl), halogen (F, Cl, Br, or I), cyano, and phenyl.

In some embodiments, the cyclized polydiene resin described herein can be in an amount of from at least about 2 weight % (e.g., at least about 3 weight %, at least about 4 weight %, at least about 5 weight %, at least about 8 weight %, or at least 10 weight %) to at most about 40 weight % (e.g., at most about 35 weight %, at most about 30 weight %, at most about 25 weight %, at most about 20 weight, or at most about 15 weight %) of the dielectric film-forming composition described herein.

In embodiments where the dielectric film-forming compositions described herein include a cyclized polydiene resin, the compositions can further include at least one cyanate ester compound as a part of the resin containing a cyclized polydiene. In some embodiments, the cyanate ester compound can have Structure (V):

$$A-(O-C\equiv N)_m, \qquad (V)$$

wherein m is an integer of at least 2 (i.e., m 2) and A is a divalent organic group containing a substituted or unsubstituted aromatic group (e.g., the cyanate ester groups —O—C≡N are directly bonded to the substituted or unsubstituted aromatic organic group). In some embodiments, the aromatic group can include aryl and heteroaryl groups. The term "aryl" used herein refers to a hydrocarbon moiety having one or more aromatic rings. Examples of aryl moieties include phenyl (Ph), phenylene, naphthyl, naphthylene, pyrenyl, anthryl, and phenanthryl. The term "heteroaryl" used herein refers to a moiety having one or more aromatic rings that contain at least one heteroatom (e.g., N, O, or S). Examples of heteroaryl moieties include furyl, furylene, fluorenyl, pyrrolyl, thienyl, oxazolyl, imidazolyl, thiazolyl, pyridinyl, pyrimidinyl, quinazolinyl, quinolyl, isoquinolyl and indolyl. Examples of suitable cyanate ester compounds have been described in, e.g., U.S. Pat. Nos. 3,595,900, 4,894,414, and 4,785,034, the contents of which are hereby incorporated by reference. In some embodiments, two or more cyanate ester compounds can be used together in the dielectric film-forming composition described herein.

In some embodiments, the cyanate ester compound described herein can be in an amount of from at least about 1 weight % (e.g., at least about 2 weight %, at least about 3 weight %, at least about 4 weight %, or at least about 5 weight %) to at most about 25 weight % (e.g., at most about 20 weight %, at most about 15 weight %, at most about 10 weight %, or at most about 8 weight %) of the dielectric film-forming composition described herein.

In some embodiments, the resin containing a polyimide, a polyamic acid ester, a cyclized polydiene resin, and/or a cyanate ester compound can be in an amount of at least about 50 wt % (e.g., at least about 55 wt %, at least about 60 wt %, at least about 65 wt %, at least about 70 wt %, at least about 75 wt %, at least about 80 wt %, at least about 85 wt %, or at least about 90 wt %) to at most about 95 wt % (e.g., at most about 90 wt %, at most about 85 wt %, at most about 80 wt %, at most about 75 wt %, at most about 70 wt %, at most about 65 wt %, or at most about 60 wt %) of a dielectric film-forming composition described herein.

In some embodiments, the dielectric film-forming compositions described herein can optionally include at least one (e.g., two, three, or four) cross-linker. In some embodiments, the cross-linker described herein can include at least two (e.g., three or four) functional groups capable of reacting with a substituted or unsubstituted alkenyl group on the cyclized polydiene resin to form a cross-linked dielectric film. An example of a cross-linker is a compound containing at least two (meth)acrylate groups, at least two olefin groups, at least two cycloolefin groups, or at least two alkynyl groups. Examples of compounds containing at least two cycloolefin groups include, but are not limited to, dicyclopentadiene, norbornadiene and the like. Examples of compounds containing two olefin groups include divinyl benzene, ethylene norbornene and the like. In some embodiments, compounds containing at least two (meth) acrylate groups include di(meth)acrylate of unsubstituted or substituted linear, branch or cyclic $C_1$-$C_{10}$ alkyl groups, and di(meth)acrylate of unsubstituted or substituted aromatic groups. Examples of such compounds include, but are not limited to, 1,3-butylene glycol di(meth)acrylate, 1,4-butanediol di(meth)acrylate, 1,5-pentanediol di(meth)acrylate, 1,6-hexanediol di(meth)acrylate, 1,9-nonanediol di(meth)acrylate, 1,10-decanediol di(meth)acrylate, 1,12-dodecanediol di(meth)acrylate, tetraethyleneglycol di(meth)acrylate, cyclohexane dimethanol di(meth)acrylate, tricyclodecanedimethanol diacrylate, 1,4-phenylene di(meth)acrylate, 2,2-bis[4-(2-hydroxy-3-methacryloxypropoxy)phenyl]propane, tricyclodecane dimethanol di(meth)acrylate, and trimethylol propane ethoxylate tri(meth)acrylate. Other examples of cross-linkers have been described in, e.g., U.S. Pat. Nos. 10,036,952; 10,563,014, and U.S. Application Publication No. 2015219990, the contents of which are hereby incorporated by reference. In some embodiments, two or more cross-linkers can be used together in a dielectric film-forming composition described herein.

In some embodiments, the at least one cross-linker can be in an amount of from at least about 1 weight % (e.g., at least about 2 weight %, at least about 3 weight %, at least about 4 weight %, or at least 5 weight %) to at most about 25 weight % (e.g., at most about 20 weight %, at most about 15 weight %, at most about 10 weight %, or at most about 8 weight %) of the total weight of a dielectric film-forming composition described herein. Without wishing to be bound by theory, it is believed that the cross-linker can result in crosslinking in the dielectric film (e.g., upon exposure to radiation or heat), which facilitates forming a solubility contrast before and after exposure. In addition, without wishing to be bound by theory, it is believed that a dielectric film-forming composition containing a relative large amount of a cross-linker can result in a dielectric film having a relatively high Tg.

In some embodiments, the dielectric film-forming compositions described herein can optionally include at least one (e.g., two, three, or four) catalyst (e.g., an initiator). The catalyst is capable of inducing crosslinking or polymerization reaction when exposed to heat (thermal initiator) and/or a source of radiation (photoinitiator). Specific examples of thermal initiators include, but are not limited to, benzoyl peroxide, dicumyl peroxide, 2,2-azobis(2-methylbutyronitrile) and the like. Other examples of thermal initiators have been described in, e.g., U.S. Pat. No. 10,563,014, the contents of which are hereby incorporated by reference. Specific examples of photoinitiators include, but are not limited to, 2-(benzoyloxyimino)-1-[4-(phenylthio)phenyl]-1-octanone (Irgacure OXE-01 from BASF), 1-[9-ethyl-6-(2-methylbenzoyl)-9H-carbazol-3-yl]ethanone 1-(O-acetyloxime) (Irgacure OXE-2 from BASF), ethoxy(2,4,6-trimethylbenzoyl) phenyl phosphine oxide (Lucerin TPO-L from BASF), NCI-831 (ADEKA Corp.), NCI-930 (ADEKA Corp.), N-1919 (ADEKA Corp.), and the like. Other examples of photoinitiators have been described in, e.g., U.S. Pat. Nos. 10,036,952 and 10,563,014, and U.S. Patent Application Nos. 2015/0219990 and 2019/0018321, the contents of which are hereby incorporated by reference.

In some embodiments, the amount of the catalyst is at least about 0.2 weight % (e.g., at least about 0.5 weight %, at least about 0.8 weight %, at least about 1.0 weight %, or at least about 1.5 weight %) and/or at most about 3.0 weight % (e.g., at most about 2.8 weight %, at most about 2.6 weight %, at most about 2.4 weight %, or at most about 2.0 weight %) of the total weight of a dielectric film-forming composition described herein.

In some embodiments, the dielectric film-forming compositions described herein can optionally include at least one (e.g., two, three, or four) solvent (e.g., an organic solvent).

Examples of suitable organic solvents include, but are not limited to, alkylene carbonates such as ethylene carbonate, propylene carbonate, butylene carbonate, and glycerin carbonate; lactones such as gamma-butyrolactone, ε-caprolactone, γ-caprolactone and δ-valerolactone; cycloketones such as cyclopentanone and cyclohexanone; linear ketones such as methyl ethyl ketone (MEK) and methyl isobutyl ketone (MIBK); esters such as n-butyl acetate; ester alcohol such as ethyl lactate; ether alcohols such as tetrahydrofurfuryl alcohol; glycol esters such as propylene glycol methyl ether acetate; glycol ethers such as propylene glycol methyl ether (PGME); cyclic ethers such as tetrahydrofuran (THF); aromatic hydrocarbons such as toluene, xylenes, mesitylene, tetralin; and pyrrolidones such as N-methyl-2-pyrrolidone.

In some embodiments, the amount of the solvent is at least about 40 weight % (e.g., at least about 45 weight %, at least about 50 weight %, at least about 55 weight %, at least about 60 weight %, or at least about 65 weight %) and/or at most about 98 weight % (e.g., at most about 95 weight %, at most about 90 weight %, at most about 85 weight %, at most about 80 weight %, or at most about 75 weight %) of the total weight of a dielectric film-forming composition described herein.

In some embodiments, the dielectric film-forming compositions described herein can optionally further include at least one (e.g., two, three, or four) adhesion promoter (e.g., a silane containing alkoxy groups). Suitable adhesion promoters are described in "Silane Coupling Agent" Edwin P. Plueddemann, 1982 Plenum Press, New York; and U.S. Pat. No. 9,519,216, the contents of which are hereby incorporated by reference.

In some embodiments, the amount of the optional adhesion promoter is at least about 0.5 weight % (e.g., at least about 0.8 weight %, at least about 1 weight %, or at least about 1.5 weight %) and/or at most about 4 weight % (e.g., at most about 3.5 weight %, at most about 3 weight %, at most about 2.5 weight %, or at most about 2 weight %) of the total weight of a dielectric film-forming composition described herein.

In some embodiments, the dielectric film-forming composition described herein can optionally include at least one (e.g., two, three, or four) filler. These fillers can generally be inorganic or organic in nature. In some embodiments, the filler is selected from the group consisting of silica, alumina, titania, zirconia, hafnium oxide, CdSe, CdS, CdTe, CuO, zinc oxide, lanthanum oxide, niobium oxide, tungsten oxide, carbon blacks, graphene, carbon nanotube (CNT), and the like. Preferably, the inorganic fillers are in a granular form having an average size of from about 0.1 micron to 2.0 microns. In some embodiments, the filler is an inorganic particle containing a ferromagnetic material. Suitable ferromagnetic materials include elemental metals (such as iron, nickel, and cobalt) or their oxides, sulfides and oxyhydroxides, and intermetallics compounds such as Awaruite ($Ni_3Fe$), Wairaruite (CoFe), $Co_{17}Sm_2$, and $Nd_2Fe_{14}B$. In some embodiments, an organic filler can be selected from the group consisting of rubber particles, polyimide particles, polyester particles, and the like. In some embodiments, the dielectric film-forming composition can include thermal conducting filler selected from a group consisting of Cu particles, diamond particles, gold particles, and the like. In some embodiments, two or more fillers can be used together in the dielectric film-forming composition described herein.

Mechanical milling (MM) is essentially a mixing carried out by means of repeated high intensity plastic deformation. The reduction of the particle size and blending of particles in new phases, the destruction of long-range order to produce an amorphous phase are a few key objectives of this technique. Without wishing to be bound by theory, it is believed that this technique can improve the dispersion of various fillers, enhance the polymer properties, modify polymer blend morphology, and enhance the compatibility in polymer blends. In some embodiments, mechanical milling process can be employed for direct solid-state mixing of PBO filler with other inorganic fillers or composite of PBO-inorganic filler for generating filler components having a particle size in the range of 10-500 nm in diameter. In some embodiments, mechanical milling process in solution stage of a dielectric film-forming composition containing a PBO additive described herein can achieve a target particle size in the range of 5-200 nm in diameter for uniform coating on various substrates such as PET film, wafer of Si, $SiO_2$, SiON, Cu, and Al, and copper clad laminate (CCL) panel and the like.

In some embodiments, the filler (e.g., organic filler) can be in an amount of at least about 1 weight % (e.g., at least about 2 weight %, at least about 3 weight %, at least about 4 weight %, or at least 5 weight %) and/or at most about 50 weight % (e.g., at most about 40 weight %, at most about 30 weight %, at most about 20 weight %, or at most about 10 weight %) of the total weight of dielectric film-forming composition described herein.

In some embodiments, the present disclosure describes a composition including:

a) at least one resin selected from the group consisting of: i) a fully imidized polyimide polymer; ii) a polyamic acid ester; iii) a cyclized polydiene resin; and iv) a mixture of a cyclized polydiene resin and a cyanate ester compound;
b) at least one additive selected from a group consisting of: i) a polybenzoxazole (PBO) precursor; ii) PBO particles; iii) a mixture of PBO and silica particles; and iv) a PBO resin containing at least two reactive functional groups;
c) at least one crosslinker;
d) at least one catalyst;
e) optionally at least one adhesion promoter; and
f) optionally at least one solvent.

In some embodiments, the present disclosure features a dielectric film (e.g., a cross-linked dielectric film) that includes (a) at least one resin selected from the group consisting of: i) a fully imidized polyimide polymer; ii) a polyamic acid ester; iii) a cyclized polydiene resin; and iv) a mixture of a cyclized polydiene resin and a cyanate ester compound; and (b) at least one additive selected from a group consisting of: i) a polybenzoxazole (PBO) precursor; ii) PBO particles; iii) a mixture of PBO and silica particles; and iv) a PBO polymer containing at least two reactive functional groups.

In some embodiments, a dielectric film can be prepared by a method that includes: a) coating a dielectric film-forming composition described herein on a substrate (e.g. a semiconductor substrate such as a wafer) to form a film (e.g., a dielectric film); b) optionally baking the film at an elevated temperature (e.g., from about 50° C. to about 150° C.) for a period of time (e.g., from about 20 seconds to about 240 seconds); and c) optionally exposing (e.g., flood exposing without using a mask such as a patterned mask) the film to radiation, heat or a combination of both radiation and heat. In some embodiments, the dielectric film prepared by the above process (which can use a broad exposure without a mask) can be crosslinked but does not include a pattern or a relief image.

Coating methods for preparation of the dielectric film include, but are not limited to, spin coating, spray coating, roll coating, rod coating, rotation coating, slit coating, compression coating, curtain coating, die coating, wire bar coating, knife coating and lamination of dry film. Semiconductor substrates could have circular shape such as wafers or could be panels. In some embodiments, semiconductor substrates could be a silicon substrate, a copper substrate, an aluminum substrate, a silicon oxide substrate, a silicon nitride substrate, a glass substrate, an organic substrate, a copper cladded laminate or a dielectric material substrate.

Film thickness of the dielectric film of this disclosure is not particularly limited. In some embodiments, the dielectric film has a film thickness of at least about 1 micron (e.g., at least about 2 microns, at least about 3 microns, at least about 4 microns, at least about 5 microns, at least about 7 microns, at least about 10 microns, at least about 15 microns, at least about 20 microns, at least about 25 microns, at least 50 microns or at least 100 microns) and/or at most about 5000 microns (5 mm) (e.g., at most about 4000 microns, at most about 3000 microns most about 2000 microns, at most about 1000 microns, at most about 500 microns, at most about 400 microns, at most about 300 microns, or at least 200 microns).

In some embodiments, the dielectric film-forming compositions of this disclosure are photopatternable. In such embodiments, the process to prepare a patterned dielectric film includes converting the dielectric film prepared from a dielectric film-forming composition into a patterned dielectric film by a lithographic process. In such cases, the conversion can include exposing the dielectric film to high energy radiation (such as electron beams, ultraviolet light, and X-ray) using a patterned mask.

After the exposure, the dielectric film can optionally be heat treated to a temperature of at least about 50° C. (e.g., at least about 55° C., at least about 60° C., or at least about 65° C.) to at most about 100° C. (e.g., at most about 95° C., or at most about 90° C., at most about 85° C., at most about 80° C., at most about 75° C., or at most about 70° C.) for at least about 60 seconds (e.g., at least about 80 seconds, or at least about 100 seconds) to at most about 240 seconds (e.g., at most about 180 seconds, at most about 120 seconds or at most about 90 seconds). The heat treatment is usually accomplished by use of a hot plate or oven.

After the exposure and/or heat treatment, the dielectric film can be developed to remove unexposed portions by using a developer to form openings or a relief image on the substrate. Development can be carried out by, for example, an immersion method or a spraying method. Microholes and fine lines can be generated in the dielectric film on the laminated substrate after development.

In some embodiments, the dielectric film can be developed by using an organic developer. Examples of such developers include, but are not limited to, cyclohexanone, xylene, toluene, tetralin, gamma-butyrolactone (GBL), dimethyl sulfoxide (DMSO), N,N-diethylacetamide, methyl ethyl ketone (MEK), methyl isobutyl ketone (MIBK), 2-heptanone, cyclopentanone (CP), cyclohexanone, n-butyl acetate (nBA), propylene glycol methyl ether acetate (PGMEA), propylene glycol methyl ether (PGME), ethyl lactate (EL), propyl lactate, 3-methyl-3-methoxybutanol, tetralin, isophorone, ethylene glycol monobutyl ether, diethylene glycol monoethyl ether, diethylene glycol monoethyl ether acetate, diethylene glycol dimethyl ether, diethylene glycol methylethyl ether, triethylene glycol monoethyl ether, dipropylene glycol monomethyl ether, methyl 3-methoxypropionate, ethyl 3-ethoxypropionate, diethyl malonate, ethylene glycol, 1,4:3,6-dianhydrosorbitol, isosorbide dimethyl ether, 1,4:3,6-dianhydrosorbitol 2,5-diethyl ether (2,5-diethylisosorbide) and mixtures thereof. Preferred developers are cyclohexanone, xylene, toluene and tetralin. These developers can be used individually or in combination of two or more to optimize the image quality for the particular composition and lithographic process.

In some embodiments, a dielectric film described herein is not photopatternable. In such cases, patterning can be accomplished by mechanical laser drilling or by a bilayer process. Laser drilling generally involves a stationary laser beam that uses its high power density to melt or vaporize materials from the target substrate or workpiece. In principle, laser drilling is governed by an energy balance between the irradiating energy from the laser beam and the conduction heat into the substrate, the energy losses to the environment, and the energy required for a phase change in the workpiece. Examples of mechanical laser drilling described in, e.g., U.S. Pat. No. 6,353,999; the contents of which are hereby incorporated by reference.

In some embodiments, a dielectric film described herein can have a relatively low dissipation factor (Df). For example, a dielectric film described herein can have a Df of at most about 0.01 (e.g., at most about 0.008, at most about 0.006, at most about 0.005, at most about 0.004, at most about 0.002, or at most about 0.001) and at least about 0.0001 when measured at 5 GHz after curing.

In some embodiments, the present disclosure features a method for preparing a dry film. In some embodiments, the method includes a) coating a carrier substrate with a dielectric film-forming composition described herein to form a coated composition; b) drying the coated composition to form a dielectric film; and c) optionally, applying a protective layer to the dielectric film. In some embodiments, the dry film can include a carrier substrate, a dielectric film, and optionally a protective layer.

In some embodiments, the carrier substrate is a single or multiple layer plastic film, which can include one or more polymers (e.g., polyethylene terephthalate). In some embodiments, the carrier substrate has excellent optical transparency and it is substantially transparent to actinic irradiation used to form a relief pattern in the polymer layer.

The thickness of the carrier substrate is preferably in the range of at least about 10 microns (e.g., at least about 15 microns, at least about 20 microns, at least about 30 microns, at least about 40 microns, at least about 50 microns or at least about 60 microns) to at most about 150 microns (e.g., at most about 140 microns, at most about 120 microns, at most about 100 microns, at most about 90 microns, at most about 80 microns, or at most about 70 microns).

In some embodiments, the protective layer is a single or multiple layer film, which can include one or more polymers (e.g., polyethylene or polypropylene). Examples of carrier substrates and protective layers have been described in, e.g., U.S. Application Publication No. 2016/0313642, the contents of which are hereby incorporated by reference.

In some embodiments, the dielectric film of the dry film can be delaminated from carrier layer as a self-standing dry film. A self-standing dry film is a film that can maintain its physical integrity without using any support layer such as a carrier layer. In some embodiments, a self-standing dielectric dry film is not crosslinked or cured and can include the components of the dielectric film-forming composition described herein except for the solvent.

In some embodiments, the dielectric film prepared from a dielectric film-forming composition described herein can have a relatively low dielectric loss tangent. For example, the dielectric loss tangent of the dielectric film (e.g., a crosslinked or uncrosslinked dielectric film) prepared from a dielectric film-forming composition of this disclosure measured at 10 GHz can be in the range of from at least about 0.001 (e.g., at least about 0.005, at least about 0.01, or at least about 0.05) to at most about 0.1 (e.g., at most about 0.08, at most about 0.06, at most about 0.05, at most about 0.04, or at most about 0.02). The dielectric constant (Dk) and dissipation factor (Df) are measured at variable frequency from 1 GHz to 75 GHz using the split cylinder resonator following IPC TM-650 2.5.5.13 method.

In some embodiments, this disclosure features three dimensional objects, that include at least one (e.g., two or three) layer of conducting metal and at least one (e.g., two or three) dielectric film (e.g., a crosslinked, patterned dielectric film) formed by using the dielectric film-forming composition of this disclosure. In some embodiments, the three dimensional object can include dielectric films in at least two stacks (e.g., at least three stacks).

The following examples are provided to illustrate the principles and practice of the present disclosure more clearly. It should be understood that the present disclosure is not limited to the examples described.

EXAMPLES

Synthesis Example 1: Synthesis of a PBO Precursor

To a 100 mL three-necked round bottom flask equipped with a mechanical stirrer, nitrogen inlet and an addition funnel, 3.66 g (0.010 mol) of hexafluoro-2,2-bis(3-amino-4-hydroxyphenyl)propane, 1.70 g (0.021 mol) of pyridine and 15 g of N-methylpyrrolidinone (NMP) were added. The solution was stirred at room temperature until it was clear and then cooled in an ice water bath at 0-5° C. To this solution, 2.03 g (0.010 mol) of isophthalyl chloride dissolved in 5 g of NMP was added drop-wise. After the addition, the resulting mixture was stirred at room temperature for 18 hours. The viscous solution was precipitated in 800 mL of de-ionized water. The polymer was collected by filtration and washed with deionized water and then with a 50/50 water/methanol mixture. The polymer was dried under vacuum at 105° C. for 24 hours to give a PBO precursor.

The yield was almost quantitative and the inherent viscosity of the polymer was 0.28 dL/g measured in NMP at the concentration of 0.5 g/dL at 25° C.

Synthesis Example 2: Synthesis of PBO Particles

A mixture of 5 g of the PBO precursor prepared in Synthesis Example 1 and 5 g of fused silica particles (Accuratus Corp) is cured at 350° C. for 4 hours in YES oven under vacuum to form silica particles coated with PBO.

Example 1: Preparation and Application of Dielectric Film-Forming Composition 1

Dielectric film-forming composition of this example is prepared by mixing using a mechanical mixer with tooth saw blade a cyclized polyisoprene (SC Rubber supplied by Fujifilm Electronic Materials U.S.A., 57.90 g of 28.5% solution of in xylene), PBO particles prepared in Synthesis Example 2 (6.6 g), tricyclodecanedimethanol diacrylate (6.60 g), 2,2-bis(4-cyanatophenyl)propane (8.25 g), dicumyl peroxide (0.50 g), and xylene (1.75 g) to obtain a homogeneous solution. The solution is filtered by using a 10.0 micron PTFE filter to give dielectric film-forming composition 1.

In this Example, SC rubber is used as a cyclized polydiene, PBO particles is used as low Df additive, tricyclodecanedimethanol diacrylate is used as a reactive functional compound, 2,2-bis(4-cyanatophenyl)propane is used as a cyanate ester compound, dicumyl peroxide is used as a thermal initiator, and xylene is used as a solvent.

The dielectric film-forming composition 1 is applied on a 35 micron thick PET film using an applicator to form a film. The film is baked at 105° C. for 7 minutes using a hot plate to remove the majority of the solvent. The film is then baked at 160° C. for 185 minutes under nitrogen to achieve a stable dielectric film with a thickness of 90 microns. After the dielectric film is lifted from the PET film, it is placed on a 25 micron KAPTON film and then baked at 210° C. for additional 1 hour under nitrogen.

After cooling to room temperature, the dielectric film is removed from the KAPTON film and slitted to form 3 mm width films and analyzed by TMA for thermomechanical properties using TMA 450 (available from TA Instruments, USA). The CTE (coefficient of linear thermal expansion) is 80 ppm/K measured at the temperature range from 25° C. to 120° C.

Other aspects, embodiments, and features are within the scope of the following claims.

What is claimed is:

1. A dielectric film-forming composition, comprising:

a) at least one resin selected from the group consisting of:
  i) a fully imidized polyimide polymer;
  ii) a polyamic acid ester;
  iii) a cyclized polydiene resin; and
  iv) a mixture of a cyclized polydiene resin and a cyanate ester compound; and b) at least one additive selected from the group consisting of:
  i) PBO particles; and
  ii) a mixture of PBO particles and silica particles.

2. The composition of claim 1, wherein the at least one resin is from about 50 wt % to about 95 wt % of the composition.

3. The composition of claim 1, wherein the at least one additive is from about 5 wt % to about 50 wt % of the composition.

4. The composition of claim 1, further comprising at least one cross-linker, at least one catalyst, at least one adhesion promoter, or at least one solvent.

5. The composition of claim 2, wherein the at least one additive is from about 5 wt % to about 50 wt % of the composition.

6. The composition of claim 5, further comprising at least one cross-linker, at least one catalyst, at least one adhesion promoter, or at least one solvent.

7. The composition of claim 3, further comprising at least one cross-linker, at least one catalyst, at least one adhesion promoter, or at least one solvent.

8. The dielectric film-forming composition of claim 1, wherein the PBO particles comprise silica particles coated with PBO.

9. The dielectric film-forming composition of claim 8, wherein the at least one additive comprises the silica particles coated with PBO.

10. A process of preparing a dielectric film, comprising:
a) coating the dielectric film-forming composition of claim 1 on a substrate to form a film; and
b) optionally baking the film at a temperature from about 50° C. to about 150° C. for about 20 seconds to about 240 seconds.

11. The process of claim 10, further comprising exposing the film to radiation, heat, or a combination thereof without a mask.

12. A process for preparing a dry film, comprising:
a) coating a carrier substrate with the dielectric film-forming composition of claim 1 to form a coated composition;
b) drying the coated composition to form a dielectric film; and
c) optionally, applying a protective layer to the dielectric film.

13. A dielectric film, comprising:
(a) at least one resin selected from the group consisting of:
i) a fully imidized polyimide polymer;
ii) a polyamic acid ester;
iii) a cyclized polydiene resin; and
iv) a mixture of a cyclized polydiene resin and a cyanate ester compound; and
b) at least one additive selected from the group consisting of:
i) PBO particles; and
ii) a mixture of PBO particles and silica particles.

14. The dielectric film of claim 13, wherein the dielectric film has a dissipation factor (Df) at 5 GHz of at most 0.01 after curing.

15. A process of preparing a dielectric film, comprising:
a) coating the dielectric film-forming composition of claim 6 on a substrate to form a film; and
b) optionally baking the film at a temperature from about 50° C. to about 150° C. for about 20 seconds to about 240 seconds.

16. The process of claim 15, further comprising exposing the film to radiation, heat, or a combination thereof without a mask.

17. A process for preparing a dry film, comprising:
a) coating a carrier substrate with the dielectric film-forming composition of claim 11 to form a coated composition;
b) drying the coated composition to form a dielectric film; and
c) optionally, applying a protective layer to the dielectric film.

* * * * *